(12) United States Patent
Huang et al.

(10) Patent No.: US 10,764,143 B2
(45) Date of Patent: Sep. 1, 2020

(54) SYSTEM AND METHOD FOR ENFORCING GROUP POLICIES FOR MTC DEVICES TO PERFORM BACKGROUND DATA TRANSFERS

(71) Applicant: Verizon Patent and Licensing Inc., Arlington, VA (US)

(72) Inventors: Ye Huang, San Ramon, CA (US); Gerardo S. Libunao, Manalapan, NJ (US); James Mathison, Warren, NJ (US); Sudhakar Reddy Patil, Flower Mound, TX (US); Violeta Cakulev, Millburn, NJ (US); Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 201 days.

(21) Appl. No.: 15/905,451

(22) Filed: Feb. 26, 2018

(65) Prior Publication Data
US 2019/0268230 A1 Aug. 29, 2019

(51) Int. Cl.
*H04L 12/24* (2006.01)
*H04L 12/813* (2013.01)

(52) U.S. Cl.
CPC .......... *H04L 41/0893* (2013.01); *H04L 41/12* (2013.01); *H04L 47/20* (2013.01)

(58) Field of Classification Search
None
See application file for complete search history.

(56) References Cited

U.S. PATENT DOCUMENTS

| | | | | |
|---|---|---|---|---|
| 2010/0284278 A1* | 11/2010 | Alanara | ............... | H04L 47/11 370/235 |
| 2011/0191482 A1* | 8/2011 | Przybysz | ............... | H04L 12/14 709/228 |
| 2012/0144049 A1* | 6/2012 | Lopez Nieto | ........... | H04L 12/14 709/228 |
| 2012/0209946 A1* | 8/2012 | McClure | ............. | H04N 21/233 709/217 |
| 2012/0220330 A1* | 8/2012 | Goldner | ............ | H04L 12/1407 455/517 |
| 2012/0276867 A1* | 11/2012 | McNamee | .......... | H04L 12/1407 455/406 |
| 2013/0042011 A1* | 2/2013 | Sugizaki | ............ | H04Q 3/0045 709/227 |
| 2013/0159521 A1* | 6/2013 | Marocchi | ............ | H04W 76/40 709/225 |
| 2015/0120727 A1* | 4/2015 | Shinde | .................... | G06F 16/38 707/736 |
| 2015/0163813 A1* | 6/2015 | Zhang | ............... | H04W 72/0493 370/329 |

(Continued)

*Primary Examiner* — Hassan A Phillips
*Assistant Examiner* — Gautam Sharma (57) ABSTRACT

A system in wireless core network obtains a group policy to support background data transfer for a group of user equipment (UEs) associated with a common network area identifier. The system maps the network area identifier to one or more of a mobility management entity (MME) device and a packet data network gateway (PGW) device. The system generates a configuration command to enforce the group policy by the one or more of the MME device or the PGW device and configures, based on the configuration command, the one or more of the MME device or the PGW device to enforce the group policy.

20 Claims, 9 Drawing Sheets

(56) References Cited

U.S. PATENT DOCUMENTS

2015/0382386 A1\* 12/2015 Castro Castro ....... H04W 48/17
    370/329
2018/0160332 A1\* 6/2018 Harris ..................... H04L 67/06
2019/0124671 A1\* 4/2019 Starsinic ................ H04W 4/70

\* cited by examiner

SYSTEM AND METHOD FOR ENFORCING GROUP POLICIES FOR MTC DEVICES TO PERFORM BACKGROUND DATA TRANSFERS

BACKGROUND

The Internet of Things (IoT) may be described as a network of physical objects or "things" embedded with various types of electronics, software, sensors, logic, circuitry, etc., that can collect and exchange data. A "thing" (also referred to as an "IOT device" or a "machine-type communication (MTC) device") may connect to a service hosted on the Internet indirectly (e.g., via another network device, such as a coordinator, a gateway, etc.) or directly.

For network service providers, IOT support involves providing network services to millions of IOT devices. The number of IOT devices is projected to grow exponentially in the years ahead. For network service providers, IOT support involves providing network services to support millions or even billions of IOT devices. Current network resource allocation and management systems are inadequate to meet these demands in an efficient manner.

DETAILED DESCRIPTION OF THE PREFERRED EMBODIMENTS

The following detailed description refers to the accompanying drawings. The same reference numbers in different drawings may identify the same or similar elements.

Systems and methods described herein relate to enforcing communication polices used by MTC devices. Many MTC-based services have flexibility in terms of when communication with MTC devices are performed, as MTC-based services are not typically bound to real-time constraints. For non-time critical applications, MTC device operators (e.g., enterprise network customers) may choose to schedule their communications with MTC devices during off-peak hours that the carrier network deems better for network load and control. The carrier benefits by controlling network resource optimization or traffic shaping, while the customer benefits from faster data transfers during the off-peak hours, less congestion, and optimized service plans. Wireless network standards, such as 3GPP, include protocols for background data transfer, which allows the customers to subscribe to certain policy-driven background data transfer plans. These policies may identify a group of MTC devices and assign transfer time windows and/or aggregate bandwidth limits for the group. However, these protocols do not include mechanisms to communicate the policies and enforce the policies within the carrier's wireless core network.

Thus, systems and methods described herein provide for communications and configurations to enforce, within a wireless core network, group policies for MTC devices performing background data transfers. According to implementations described herein, a system in a wireless core network obtains a group policy to support background data transfer for a group of MTC user equipment (UEs) associated with a common network area identifier. The group policy includes one or more of a transfer window and an aggregate bandwidth limit for the group of UEs. The system maps the network area identifier to one or more of an MME device and a packet data network gateway (PGW) device. The system generates a configuration command to enforce the group policy by the one or more of the MME or the PGW and configures, based on the configuration command, the one or more of the MME or the PGW to enforce the group policy.

Figure 1:
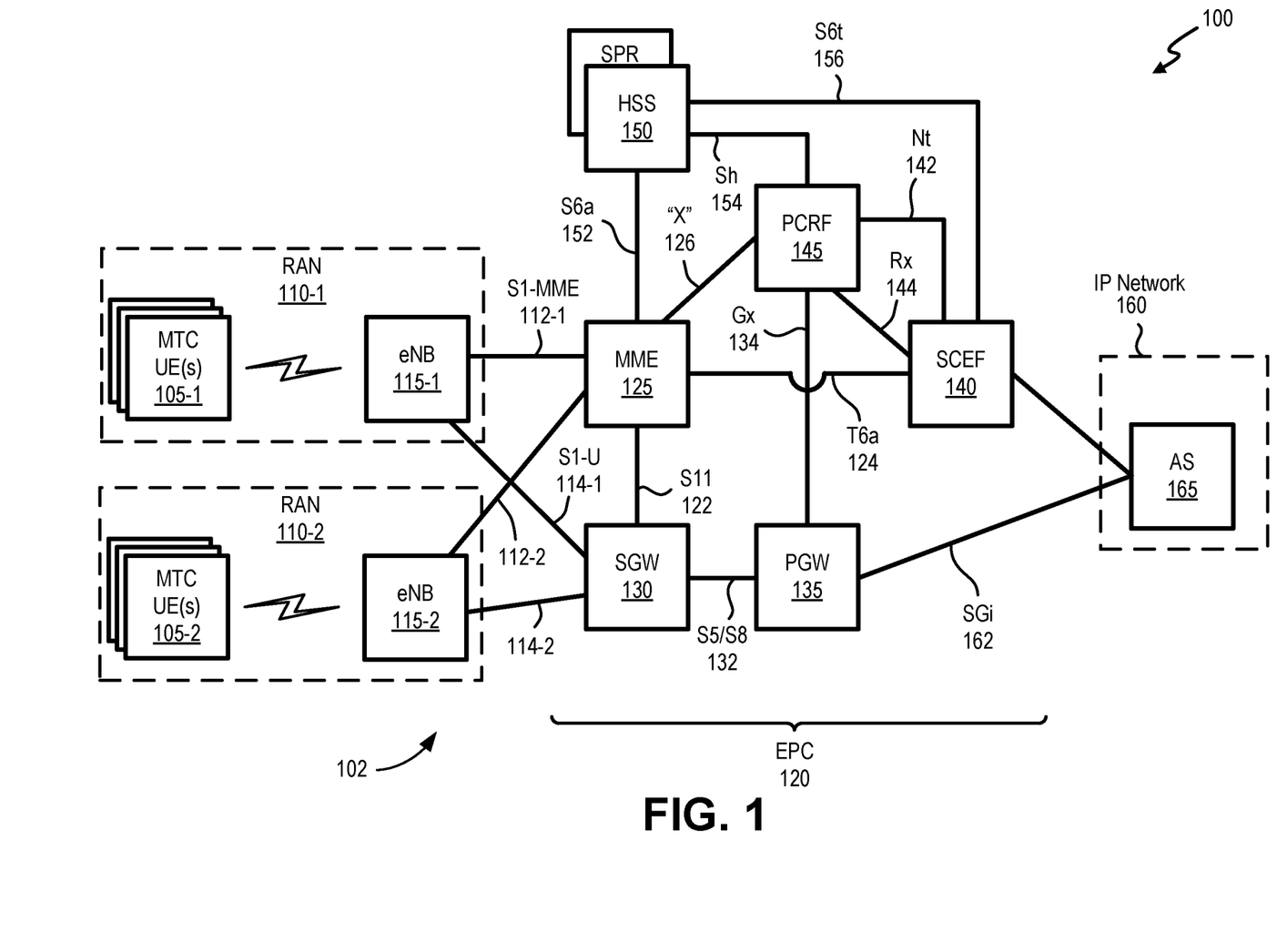
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include groups of MTC devices or MTC user equipment (UE) 105-1 and 105-2 (referred to collectively and generically as MTC UEs 105); a wireless network 102 including radio access networks (RANs) 110-1 and 110-2 (referred to collectively and generically as RAN 110) and an evolved Packet Core (EPC) 120; and an Internet Protocol (IP) network 160.

In one implementation, wireless network 102 may be a long term evolution (LTE) 4G wireless network, but could be any advanced wireless network, such as a 5G network, and may include one or more devices that are physical and/or logical entities interconnected via standardized interfaces. Wireless network 102 provides wireless packet-switched services and wireless IP connectivity to user devices (such as MTC UEs 105) to provide, for example, data, voice, and/or multimedia services. RAN 110 may include one or more base stations 115-1 and 115-2 (e.g., an enhanced NodeB, a 5G gNodeB, etc., also referred to herein as generically as eNodeB 115 or eNB 115). eNodeBs 115 may be functionally interconnected to each other in addition to being separately connected to EPC 120, and may be referred to as the evolved UMTS Terrestrial Radio Access Network (eUTRAN).

EPC 120 may include one or multiple networks of one or multiple types. According to an exemplary implementation, EPC 120 may include a complementary network pertaining to RANs 110. EPC 120 may further include a mobility management entity (MME) device 125, a serving gateway (SGW) device 130, a packet data network gateway (PGW) device 135, a service creation environment function (SCEF) 140, a policy charging rules function (PCRF) device 145, and a home subscriber server (HSS) device 150. The IP network 160 may further include one or more application servers (AS) 165. It is noted that FIG. 1 depicts a representative network environment 100 with exemplary components and configuration shown for purposes of explanation.

Other embodiments may include additional or different network entities in alternative configurations than which are exemplified in FIG. 1.

Each MTC UE 105 may include a device that communicates with another device (e.g., a device connected to IP network 160) via machine-type communications. Such machine-type communications typically do not require manual human input during operation. MTC UE 105 may include a wide range of applications for monitoring and control purposes in fields such as industrial automation, logistics, Smart Grid, Smart Cities, health, defense, agriculture, etc. MTC UE 105 may operate according to one or more versions of the LTE communication standard or other standards. In some instances, MTC UE 105 may generate short messages and/or infrequent messages to support a particular application. In other instances, MTC UE 105 may generate high bandwidth data or very frequent communication to support a particular application. According to implementations described herein, MTC UEs 105 may be grouped according to location and types of service (e.g., a background data transfer service that may be governed by a particular policy).

eNB 115 may include one or more devices and other components having functionality that allow MTC UE 105 to wirelessly connect to RAN 110. eNB 115 may interface with EPC 120 via a S1 interface, which may be split into a control plane S1-MME interface 112 and a user (or data) plane S1-U interface 114. S1-MME interface 112 may provide an interface between eNB 115 and MME device 125. S1-U interface 114 may provide an interface between eNB 115 and SGW 130 and may be implemented, for example, using a General Packet Radio Service Tunneling Protocol version 2 (GTPv2).

MME device 125 (also simply referred to as MME 125) may include a network device that implements control plane processing for EPC 120. For example, MME 125 may implement tracking and paging procedures for MTC UE 105, may activate and deactivate bearers for MTC UE 105, may authenticate a user of MTC UE 105, and may interface to non-LTE radio access networks. A bearer may represent a logical channel with particular quality of service (QoS) requirements. MME 125 may also select a particular SGW 130 for a particular MTC UE 105. A particular MME 125 may interface with other MME devices (not shown) in EPC 120 and may send and receive information associated with MTC UEs 105, which may allow one MME device to take over control plane processing of UEs serviced by another MME device, if the other MME device becomes unavailable. According to implementations described herein, MME 125 may enforce a group data path connectivity policy for MTC UEs 105 and only allow user plane connectivity within a time window indicated by the group policy. MME 125 may communicate with SGW 130 through an S11 interface 122. S11 interface 122 may be implemented, for example, using GTPv2. S11 interface 122 may be used to create and manage a new session for a particular MTC UE 105.

SGW device 130 (also simply referred to as SGW 130) may provide an access point to and from MTC UE 105, may handle forwarding of data packets for MTC UE 105, and may act as a local anchor point during handover procedures between eNBs 115. SGW 130 may interface with PGW 135 through an S5/S8 interface 132. S5/S8 interface 132 may be implemented, for example, using GTPv2.

PGW device 135 (also simply referred to as PGW 135) includes a network or computational device that functions as a gateway to IP network 160 through an SGi interface 162. In one exemplary implementation, PGW 135 may be a traffic exit/entry point for EPC 120. PGW 135 may perform policy enforcement, packet filtering for each user, charging support, lawful intercept, and packet screening. PGW 135 may also act as an anchor for mobility between 3GPP and non-3GPP technologies. According to implementations described herein, PGW 135 may monitor uplink and downlink data transfer rates for individual MTC UEs 105 in a background data transfer policy group and enforce the group level aggregated bandwidth for the policy (e.g., in contrast with individual bandwidth limits for each MTC UE 105). For example, PGW 135 may apply throttling techniques and/or drop packets to/from MTC UEs 105 when aggregate bandwidth limits are exceeded by the group of MTC UEs 105. In another implementation, PGW 135 may apply different charging codes for packets sent to/from MTC UEs 105 outside group policy time windows.

SCEF device 140 (also simply referred to as SCEF 140) may include a network or computational device that provides the capability for the creation, verification, and testing of MTC services, including background data transfers described herein. In one implementation, SCEF 140 may exchange control plane signaling with MME 125 via a T6a interface 124. In one implementation, SCEF 140 may be included as part of a control plane bearer path between MTC UE 105 and application server 165. In another implementation described further herein, SCEF 140 may issue a Background Data Transfer Configuration Request (BTC-R) to PCRF 145 to request policies for a permitted transfer window time and aggregated bandwidth associated with AS 165. SCEF 140 may interface with PCRF 145 through an Nt interface 142 or an Rx interface 144.

PCRF device 145 (also simply referred to as PCRF 145) may include a network or computational device that provides policy control decision and flow based charging control functionalities. PCRF 272 may provide network control regarding service data flow detection, gating, QoS and flow based charging, etc. PCRF 240 may determine how a data stream is treated once mapped to a bearer, and may ensure that the user plane traffic mapping and treatment is in accordance with a user's subscriber profile. In another implementation described further herein, PCRF 145 may receive a Background Data Transfer Configuration Request (BTC-R) from SCEF 140 and issue policies to MME 125 and PGW 135 for enforcing permitted transfer window time and aggregated bandwidth associated with AS 165. According to an implementation described herein, PCRF 240 may communicate with PGW 235 using a Gx interface 134 and may communicate with MME 125 using a new interface "X" 126. Interface "X" 126 may represent, for example, a structured interface for an evolved packet core network that has not been defined previously in wireless network standards. Gx interface 134 and interface "X" 126 may be implemented, for example, using a Diameter-based protocol.

HSS device 150 (also simply referred to as HSS 150) may store information associated with MTC UEs 105 and/or information associated with users/owners of MTC UE 105. For example, HSS 150 may store user profiles, such as a Subscriber Profile Repository (SPR), that include authentication and access authorization information. As described further herein, the subscriber profiles may store use restrictions or bearer preferences for a particular MTC UE 105, such as restricting a particular MTC UE 105 to certain transfer windows or to aggregated bandwidth limits. HSS 150 may communicate with MME 125 through an S6a interface 152. PCRF 145 may communicate with HSS 150 through an Sh interface 154 to obtain a subscriber profile that identifies services to which a customer, associated with MTC UE 105, has subscribed. The subscriber profile may also identify particular services (e.g., Background Data Transfer, etc.), to which the MTC UE 105 has subscribed, that are to be provided when an online charging action is to be performed. SCEF 140 may communicate with HSS 150 through an S6t interface 156 to provide profile information and associate network devices (e.g., MME 125 and PGW 135) with network area identifiers.

IP network 160 may include one or multiple networks of one or multiple types. For example, IP network 160 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. As illustrated, according to an exemplary embodiment, IP network 160 includes application server 165. According to other exemplary embodiments, application server 165 and/or a portion thereof may be implemented in a different network.

Application server 165 may include one or more computing or network devices that may receive and process MTC data from MTC UEs 105. In one implementation, application server 165 and MTC UE 105 may interact with one another using HTTP, secure HTTP (HTTPS), or another type of IP-based protocol. In another implementation, MTC UE 105 may interact with application server 165 over the control plane using a non-IP bearer.

Devices and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Typical network usage patterns for MTC UE 105 include short messages and/or infrequent messages, such as meters sending daily readings that may not be particularly time sensitive. Such usage patterns can be supported by wireless network 102 using either a user plane (e.g., a packet data network (PDN) connection setup through PGW 135) or a control plane (e.g., non-access stratum (NAS) signaling through MME 125). For either type of delivery (user plane or control plane), customers (e.g., operators of AS 165 and/or MTC UEs 105) may subscribe to policy driven background data transfer plans (e.g., provided by the mobile carrier that operates wireless network 102). Policies to enforce such plans may be applied to groups of MTC UEs in the same location (e.g., MTC UEs 105-1 associated with RAN 110-1) or multiple locations (e.g., MTC UEs 105-1 and MTC UEs 105-2).

For example, depending on use cases, subscription plans, etc., a mobile carrier (for wireless network 102) may want to restrict MTC UEs 105 to transferring data only at certain off-peak hours, thereby reducing network congestion during certain hours. As another example, the mobile carrier may charge differently for transfers during different time periods to incentivize off-peak data transfers by MTC UEs 105. As still another example, the mobile carrier may prevent the combined bandwidth used by MTC UEs 105-1 over RAN 110-1 from exceeding a particular aggregate bandwidth threshold at any given time. These types of restrictions. e.g., temporal, bandwidth, congestion, etc. may be supported using the background data transfer configuration commands described herein.

Figure 2:
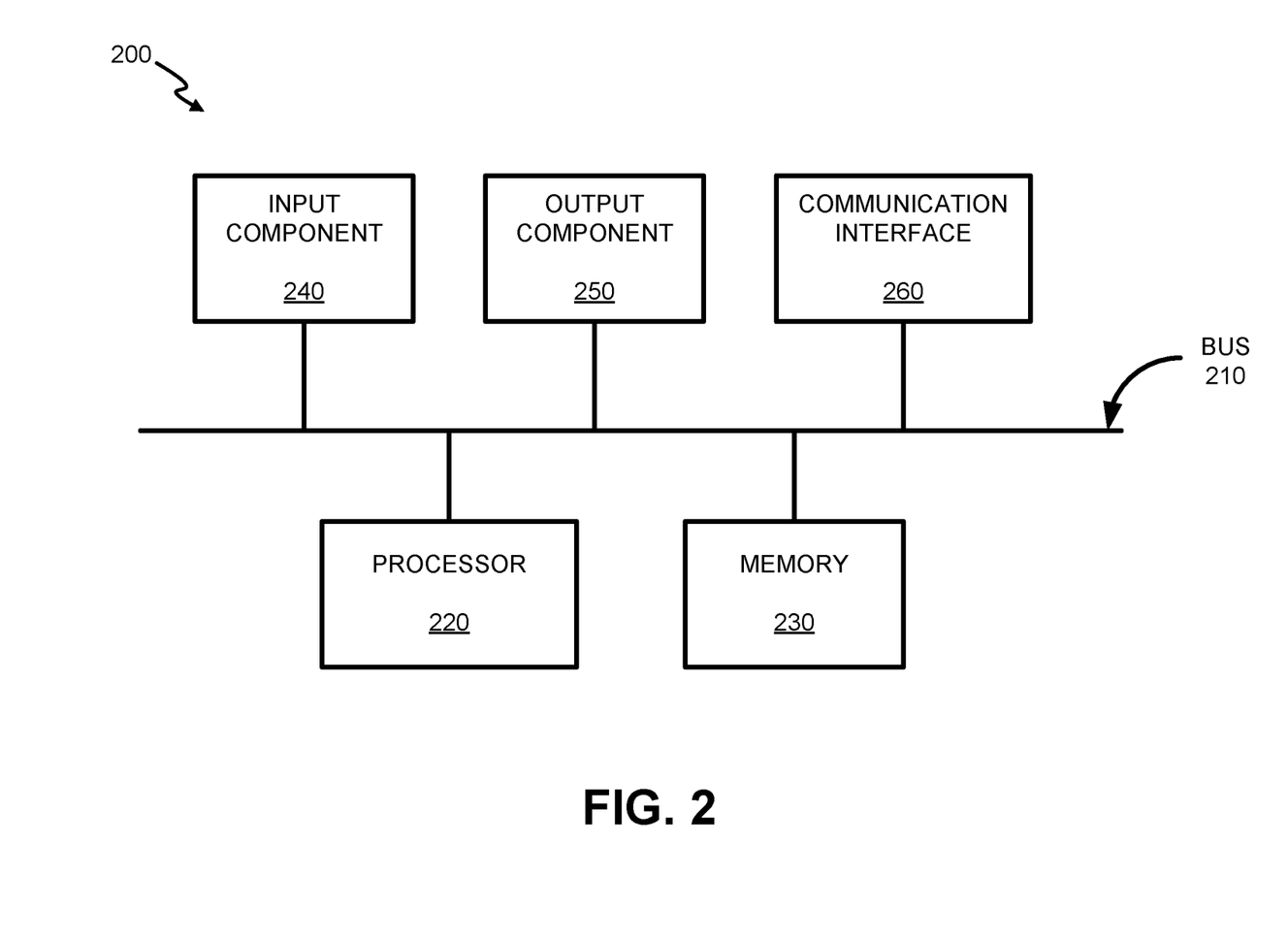
FIG. 2 shows a diagram of exemplary components that may be included in a computing device included in the network environment shown in FIG. 1.

FIG. 2 is a diagram illustrating exemplary components of a device 200. Device 200 may correspond, for example, to a component of MTC UE 105, eNB 115, MME 125, SGW 130, PGW 135, SCEF 140, PCRF 145, HSS 150, application server 165, or another component of wireless network 102. Alternatively or additionally, MTC UE 105, eNB 115, MME 125, SGW 130, PGW 135, SCEF 140, PCRF 145, HSS 150, and application server 165 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to MTC UE 105/eNB 115, and receive RF signals over the air from eNB 115/MTC UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3A:
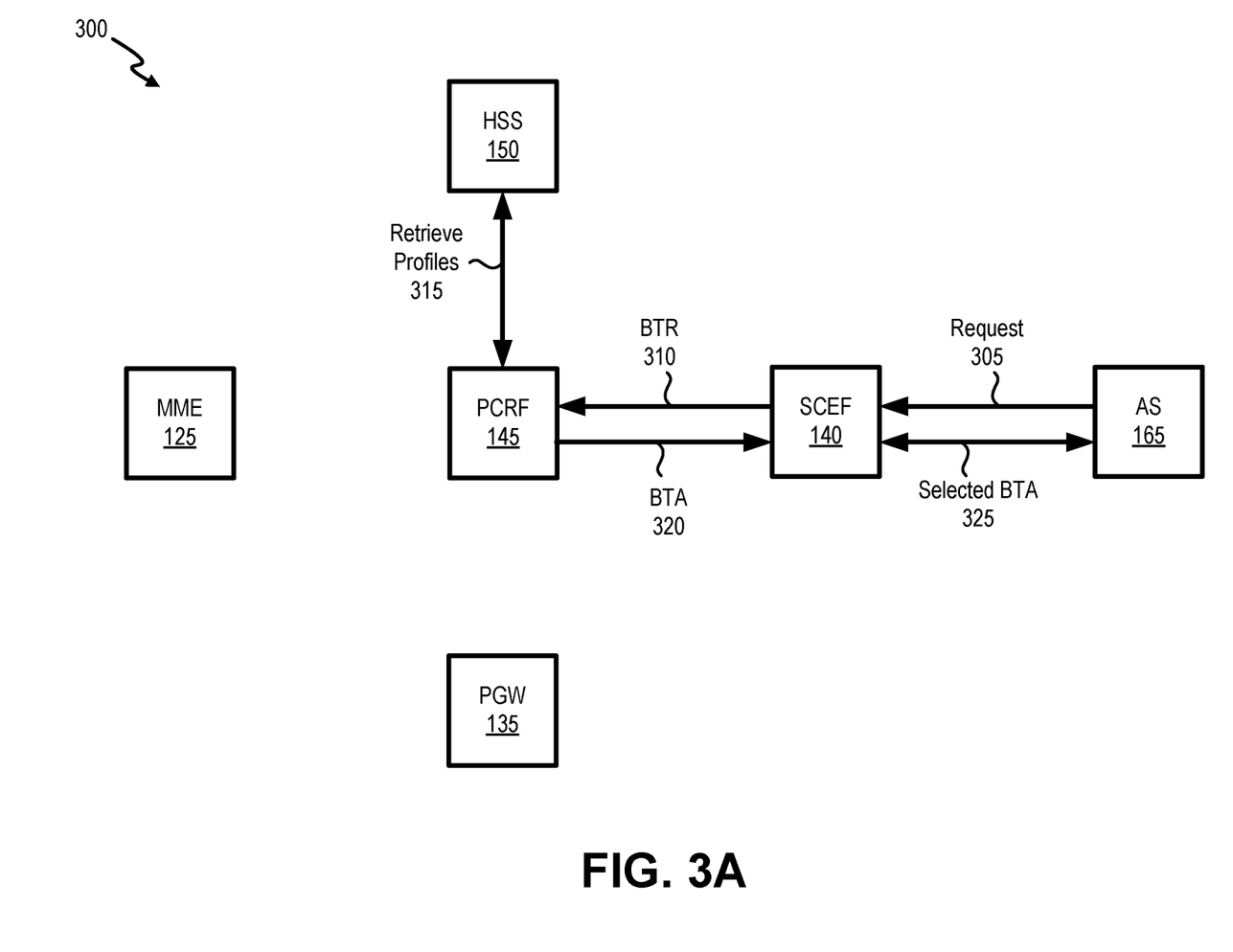
FIG. 3A is a diagram showing exemplary communications for configuring group policies in a portion of the network environment of FIG. 1
Figure 3B:
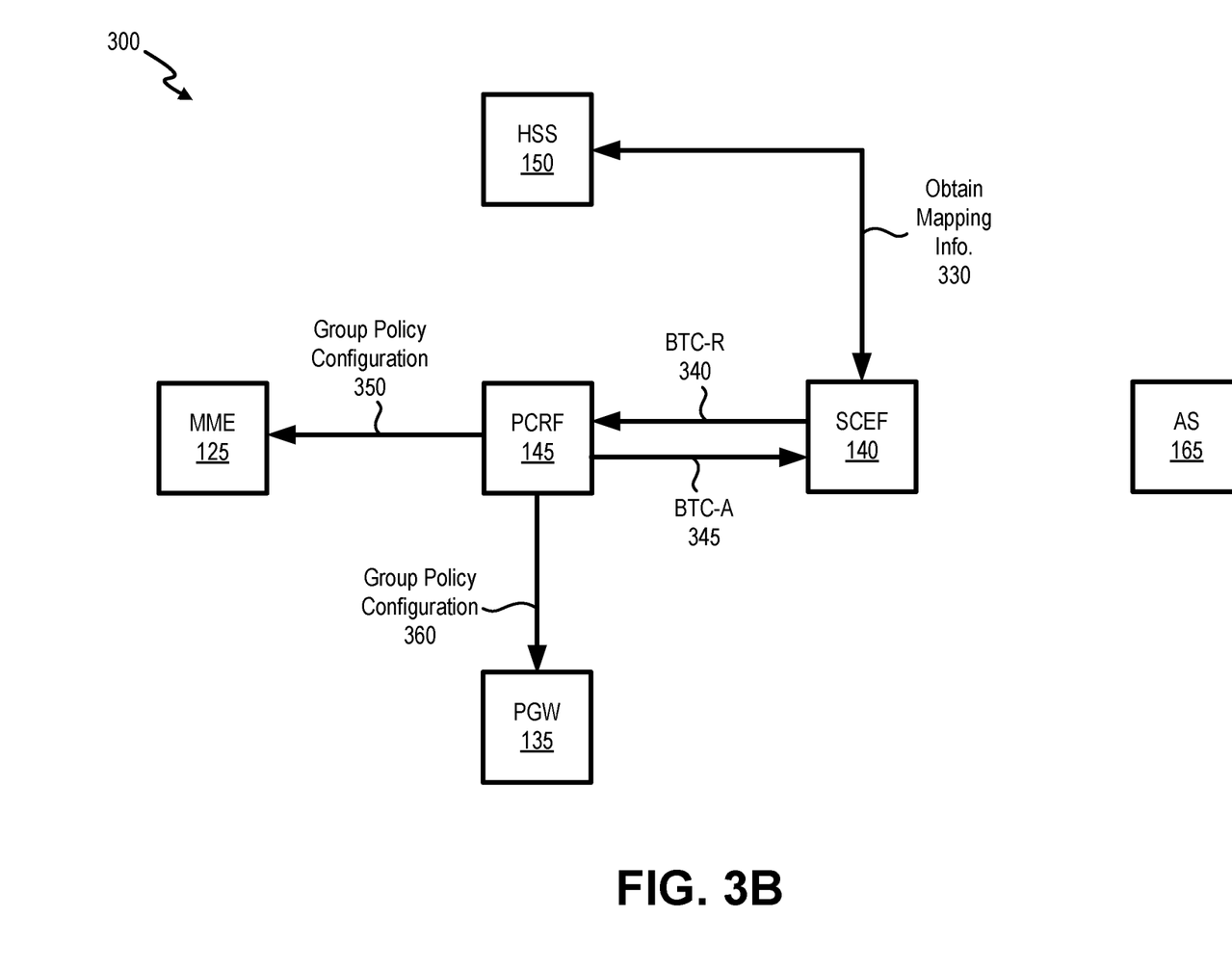
FIGS. 3B and 3C are diagrams showing exemplary communications for configuring enforcement of group policies in a portion of the network environment of FIG. 1.
Figure 3C:
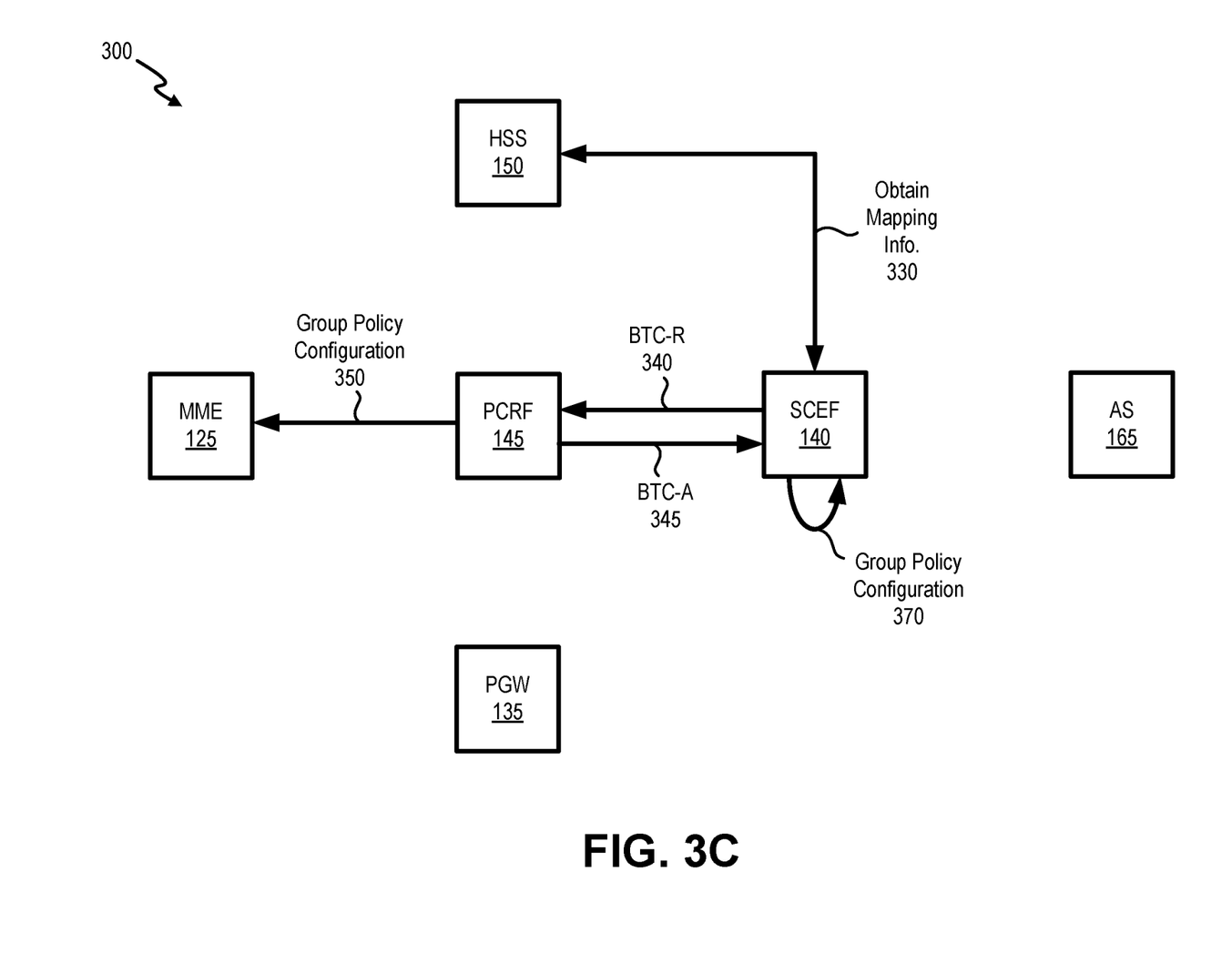

FIGS. 3A, 3B, and 3C are diagrams showing communications in a portion 300 of network environment 100. Network portion 300 may include MME 125, PGW 135, SCEF 140, PCRF 145, HSS 150, and AS 165. FIG. 3A represents communications for requesting background data transfer policy for a group of devices targeted in a particular geographic area and/or intended time window. FIG. 3B represents communications for configuring enforcement of the background data transfer policy over a user plane within wireless network 102. FIG. 3C represents communications for configuring enforcement of the background data transfer policy over a control plane within wireless network 102.

As shown in FIG. 3A, AS 165 may submit a request 305 to SCEF 140 to apply background data transfer for a group of devices. In one implementation, request 305 may be provided to SCEF 140 indirectly, such as through a user portal or another intermediate system. Request 305 may include a list of one or multiple MTC UEs 105, such as a list of MTC UE descriptors (e.g., unique identifiers, such as an International Mobile Station Equipment Identity (IMEI), serial number, etc.). MTC UE descriptors may also indicate, for example, the owner of MTC UEs 105, device certificates, an IP address for each MTC UE 105, etc. Request 305 may also include an indication to associate the listed MTC UEs 105 as a group with background data transfer policies.

SCEF 140 may receive request 305 and may generate/submit a background data transfer request (BTR) 310 to PCRF 145 (e.g., via Nt interface 142) based on request 305. BTR 310 may request a transfer policy for the particular AS 165, BTR 310 may include a network/geographic area for the group of MTC UEs 105, the number of UEs (e.g., MTC-UEs 105-1) in the group, a transfer time window, etc.

Figure 4A:
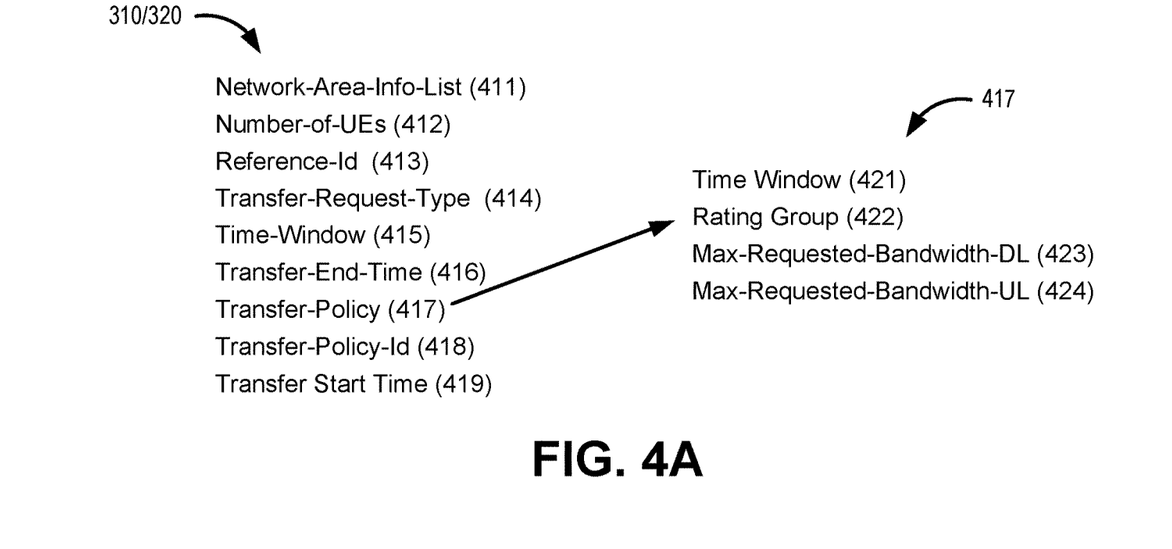
FIG. 4A is a diagram illustrating exemplary fields of a background data transfer request (BTR) and background data transfer answer (BTA) command pair of FIG. 3A.

PCRF 145 may receive BTR 310 and may retrieve profile data, as indicated by reference 315, and other information from HSS 150 to configure background data transfer policies for the identified group of MTC UEs 105. PCRF 145 may use information from HSS to assemble one or more policy options that match the parameters of BTR 310. PCRF 145 may return the permitted policies, including aggregated max UL and DL bandwidth based on the subscriptions and network load conditions. PCRF 145 may provide the response to SCEF 140 as background data transfer answer (BTA) 320 (e.g., via NT interface 142). FIG. 4A is a diagram illustrating exemplary fields of BTR 310 and/or BTA 320.

As shown in FIG. 4A, BTR 310/BTA 320 may include attribute value pairs (AVPs) including a generating a background data transfer request (BTR) or receiving a background data transfer answer (BTA), a number-of-UEs AVP 412, a reference-Id AVP 413, a transfer-request-type AVP 414, a time-window AVP 415, a transfer-end-time AVP 416, a transfer-policy AVP 417, a transfer-policy-Id AVP 418, and a transfer-start-time AVP 419. Network-area-info-list AVP 411 may contain contains the network area information, such as a network area identifier or location area identity, that corresponds to a relevant geographic location of the network where the group of MTC UEs 105 are to connect. Number-of-UEs AVP 412 indicates the expected number of MTC UEs 105 in the group. Reference-Id AVP 413 provides an identifier (assigned by PCRF 140) that correlates request 305 with the transfer policy retrieved from HSS 150. Transfer-request-type AVP 414 indicates a reason for sending BTR 310 (e.g., to initiate a transfer policy request procedure). Time-window AVP 415 includes a start time and end time that defines the time interval during which MTC UEs 105 in the group may perform background data transfer. Transfer-end-time AVP 416 indicates the network time protocol (NTP) time at which devices in the group are required to stop the background data transfer. Transfer-policy AVP 417, described further below, indicates the background data transfer policy determined by PCRF 140. Transfer-policy-Id AVP 418 includes the identifier for the background data transfer policy, which may be a unique policy identifier assigned by PCRF 145. Transfer-start-time AVP 419 indicates the NTP time when devices in the group are allowed to start the background data transfer.

As further shown in FIG. 4A, transfer-policy AVP 417 may include a Time-Window field 421, a Rating-Group field 422, a Max-Requested-Bandwidth-DL field 423, a Max-Requested-Bandwidth-UL field 424. Time-Window field 421 may identify a Transfer-Start-Time and a Transfer-End-Time that designates the time interval during which background data transfer may be performed by the designated MTC UEs 105. Rating-Group field 422 may include a charging key for the aggregated traffic of all the designated MTC UEs 105. Max-Requested-Bandwidth-DL field 423 may identify the maximum aggregated authorized bandwidth for downlink to the designated MTC UEs 105. Max-Requested-Bandwidth-UL field 424 may identify the maximum aggregated authorized bandwidth for uplink from the designated MTC UEs 105.

Returning to FIG. 3A, SCEF 140 may receive BTA 320 and forward BTA 320 to AS 165, as indicated by reference 325. If BTA 320 includes multiple policy options, AS 165 may select one of the options and confirm the selection to SCEF 140. AS 165 may then use the selected policy for implementing background data transfers over wireless network.

However, enforcement of some aspects of the policy provided to (or selected by) AS 165 requires additional network activity. For example, for aggregated bandwidth, PGW 135 needs to be configured to enforce policy group bandwidth totals. Furthermore, to enforce transfer windows in real time over the data plane, MME 125 needs to be informed of and enforce the background data transfer policy and only allow the user plane connectivity within the granted time window. Similarly, to enforce transfer windows in real time over the control plane, SCEF 140 needs to enforce the background data transfer policy for aggregated bandwidth or to limit control plane data transfers outside of the granted time window.

Referring to FIG. 3B, after receiving BTA 320 and/or selected BTA 325, SCEF 140 may initiate configuration of key network elements to enforce the background data transfer policy of BTA 320 over a user plane. According to an implementation described herein, SCEF 140 and PCRF 145 may use a new Background Data Transfer Configuration Request (BTC-R) 340 and Background Data Transfer Configuration Answer (BTC-A) 335 command pair. BTC-R 340 and BTC-A 345 may be exchanged, for example, using an expanded Nt interface 142. In another implementation, BTC-R 340 and BTC-A 345 may be exchanged using an expanded Rx interface 144. In other implementations, a different command format may be used to initiate configuration of key network elements to enforce the background data transfer policy.

SCEF 140 may map the area identifier from BTA 320 (e.g., network-area-info list AVP 411) to a target MME (e.g., MME 125) and a target PGW (e.g., PGW 135). As shown in FIG. 3B, to identify the target MME and target PGW, SCEF 140 may obtain mapping information 330 from HSS 150 using, for example, S6t interface 156. In another implementation, the target MME and the target PGW may also be identified based on other profile information from HSS 150. Using the mapping information, SCEF 140 may generate BTC-R 340 and send BTC-R 340 to PCRF 145. BTC-R 340 may generally include fields and/or AVPs to allow PCRF 145 to configure MME 125 and PGW 135 for enforcement of the background data transfer policy defined by BTA 320. PCRF 145 may receive BTC-R 340 and may respond with BTC-A 345 to confirm configuration logistics.

Figure 4B:
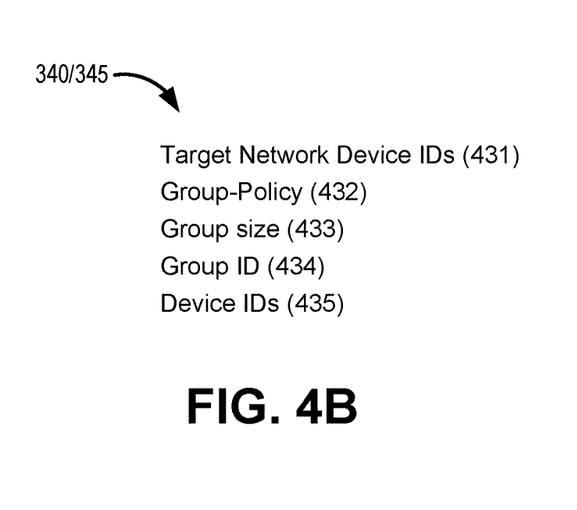
FIG. 4B is a diagram illustrating exemplary fields of a background data transfer answer configuration request (BTC-R) and background data transfer configuration answer (BTC-A) command pair of FIGS. 3B and 3C.

FIG. 4B is a diagram illustrating exemplary fields of BTC-R 340 and/or BTC-A 345. As shown in FIG. 4B, BTC-R 340/BTC-A 345 may include a target network device identifier field 431, a group policy field 432, (e.g., from Transfer-Policy AVP 417), a group size field 433 (e.g., from number-of-UEs AVP 412), a group identifier field 434 (e.g., for the group of MTC UEs 105), and a device identifiers field 435.

Target network device identifier field 431 may include a device identifier or address for the target MME (e.g., MME 125) and/or target PGW (e.g., PGW 135) that will enforce the background data transfer policy. Group policy field 432 may include the transfer policy specifications (e.g., from Transfer-Policy AVP 417) of the background data transfer policy. Group size field 433 may indicate the number of MTC UEs 105 (e.g., from number-of-UEs AVP 412) to which the background data transfer policy applies. Group identifier field 434 may include a unique identifier for the group of MTC UEs 105 to which the background data transfer policy applies. Device identifiers field 435 may include a list of identifiers for each MTC UE 105 in the group correlating to group size field 433 and group identifier field 434.

Although FIG. 4B show exemplary fields of BTC-R 340/BTC-A 345, in other implementations, BTC-R 340/BTC-A 345 may include different fields, fewer fields, or additional fields than depicted in FIG. 4B. For example, in another implementation, one BTC-R 340/BTC-A 345 pair may be configured with specific commands for a target MME and another BTC-R 340/BTC-A 345 pair may be configured with specific commands for a target PGW.

In turn, PCRF 145 may send to MME 125 and PGW 135 the group policy configuration for MME 125 and PGW 135 to enforce the group policy. Particularly, PCRF 145 may send group policy configuration information 350 to MME 125 to primarily enforce the permitted transfer window time in BTC-R 340/BTC-A 345. Group policy configuration information 350 may be provided, for example, via the new "X" interface 126. Similarly, PCRF 145 may send group policy configuration information 360 to PGW 135 to primarily enforce the aggregated bandwidth for the group policy in BTC-R 340/BTC-A 345. Group policy configuration information 360 may be provided, for example, via Gx interface 134.

Figure 5A:
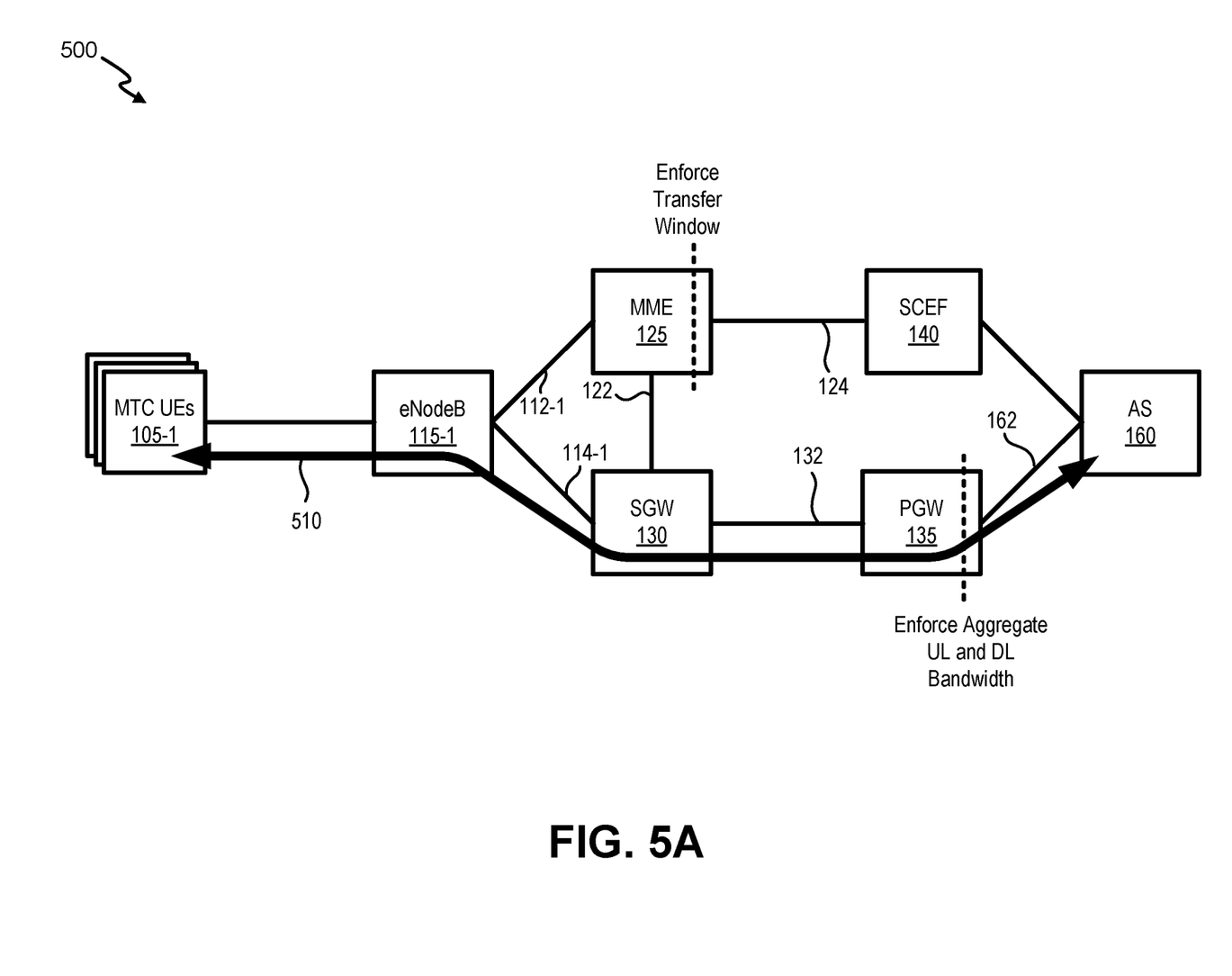
FIGS. 5A and 5B provide schematics of bearer paths for a portion of the network environment of FIG. 1.
Figure 5B:
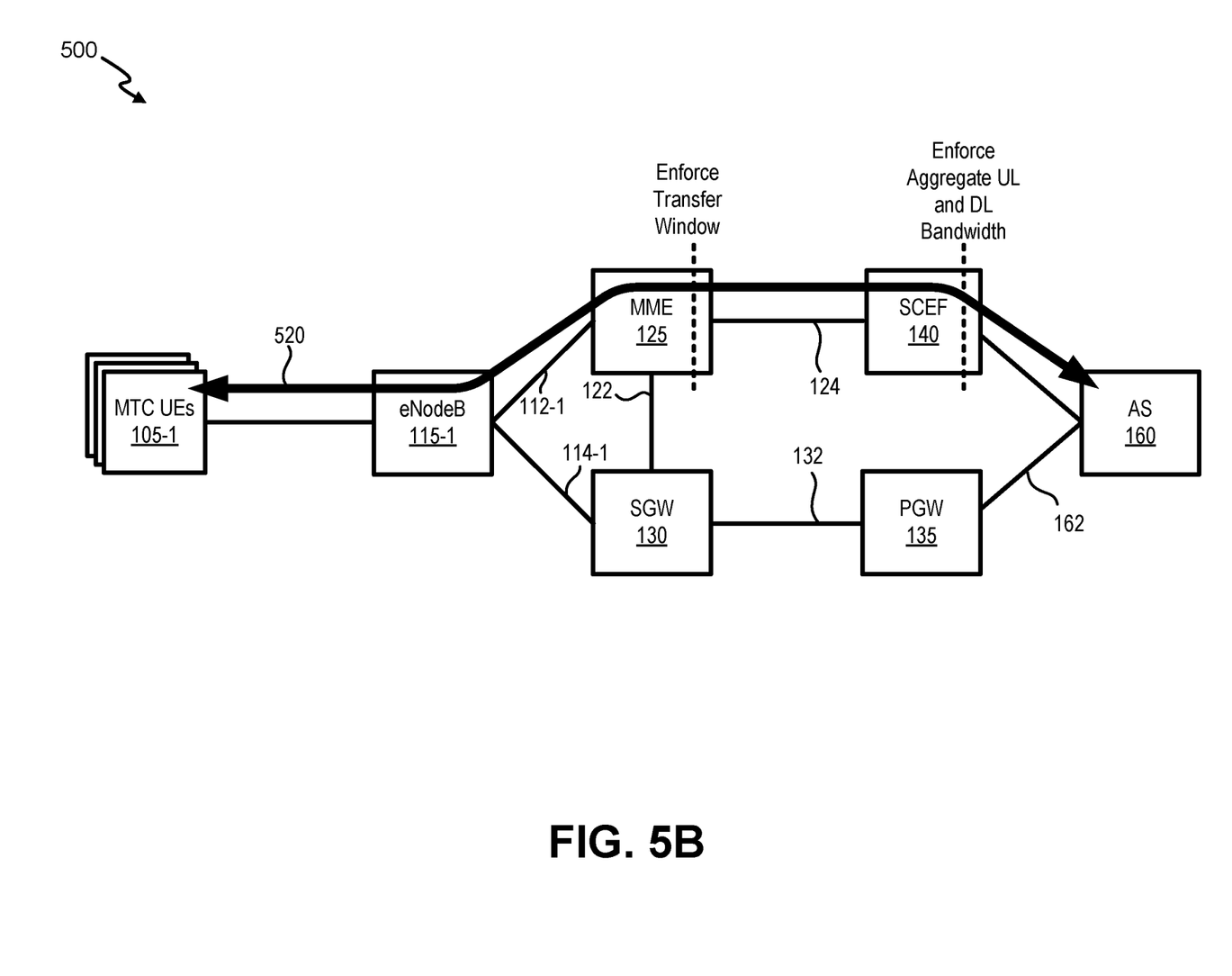

MME 125 and PGW 135 may use group policy configuration information 350/360 to enforce transfer windows and aggregate bandwidth for a group of MTC UEs 105. For example, FIGS. 5A and 5B provide schematics of bearer paths for a portion 500 of network environment 100. More particularly, FIG. 5A demonstrates a route for user plane communications between MTC UEs 105-1 and AS 160, while FIG. 5B demonstrates a route for control plane communications between MTC UEs 105-1 and AS 160.

As shown in FIG. 5A, each of MTC UEs 105-1 may use similar IP bearer paths 510 that each include a route between an MTC UE 105-1 and SGW 130 (via eNB 115-1), SGW 130 and PGW 135, and PGW 135 and application server 165. Referring to FIGS. 3B and 5A, in response to receiving group policy configuration information 350, MME 125 will enforce the transfer window for the group policy by restricting user plane connectivity (e.g., over S1-U interface 114-1) to the designated transfer window. Additionally, MME 125 may release user plane connectivity upon expiration of the transfer window.

Still referring to FIGS. 3B and 5A, in response to receiving group policy configuration information 360, PGW 135 will monitor UL and DL data transfer rates of individual MTC UEs 105-1 over bearer paths 510 and enforce the group level aggregated bandwidth policy. Enforcement of the group level aggregated bandwidth can provide better customer experience and reduce the customer application complexity. Additionally, in another implementation, PGW 135 may also release, allow, and/or disallow data transfer to/from MTC UEs 105-1 within the group policy when MTC UEs 105-1 try to perform a data transfer outside of the granted transfer window.

Referring to FIG. 3C, for a background data transfer policy for commutations over the control plane, SCEF 140 may initiate configuration of key network elements to enforce the background data transfer policy of BTA 320 over the control plane. SCEF 140 may receive BTA 320 and/or selected BTA 325 (FIG. 3A) which may indicate that MTC UEs 105-1 use the control plane (e.g., NAS signaling) for communications with AS 165. As shown in FIG. 3C, SCEF 140 may obtain mapping information 330 from HSS 150, similar to that described above in FIG. 3B. Using the mapping information, SCEF 140 may generate BTC-R 340 and send BTC-R 340 to PCRF 145. BTC-R 340 may generally include fields and/or AVPs to allow PCRF 145 to configure MME 125 for enforcement of the background data transfer policy in BTA 320. PCRF 145 may receive BTC-R 340 and may respond with BTC-A 345 to confirm configuration logistics.

Also in response to BTC-R 340, PCRF 145 may send to MME 125 the group policy configuration for MME 125 to enforce the group policy. Particularly, PCRF 145 may send group policy configuration information 350 to MME 125 to primarily enforce the permitted transfer window times in BTC-R 340/BTC-A 345. Group policy configuration information 350 may be provided, for example, via "X" interface 126. In contrast with communications of FIG. 3B, for control plane background data transfer policy enforcement in FIG. 3C, SCEF 140 may enforce aggregated bandwidth for the group policy in BTC-R 340/BTC-A 345. Thus, SCEF 140 may use the group policy in BTC-R 340/BTC-A 345 to generate group policy configuration information 370. Thus, PCRF 145 may not send group policy configuration information to PGW 135.

As shown in FIG. 5B, each of MTC UEs 105-1 may use similar non-IP bearer paths 520 that include a route between MTC UE 105-1 and MME 125 (via eNB 115-1), MME 125 and SCEF 140, and SCEF 140 and application server 165. Referring to FIGS. 3C and 5B, in response to receiving group policy configuration information 350, MME 125 will enforce the transfer window for the group policy by restricting control plane connectivity (e.g., over S1-MME interface 112-1) to the designated transfer window. Additionally, MME 125 may release control plane connectivity for NAS data transfer upon expiration of the transfer window.

Still referring to FIGS. 3C and 5B, SCEF 140 will monitor UL and DL data transfer rates of individual MTC UEs 105-1 over bearer paths 520 and enforce the group level aggregated bandwidth policy. Additionally, in another implementation, SCEF 140 may also release, allow, and/or disallow data transfer to/from MTC UEs 105-1 within the group policy when MTC UEs 105-1 try to perform a data transfer outside of the granted transfer window.

Although FIGS. 3A-3C, 5A and 5B show exemplary communications within network portions 300 and 500, in other implementations, different communications may be used than depicted in FIGS. 3A-3C, 5A and 5B. For example, in one implementation where a background data transfer policy is only directed to an aggregate bandwidth, a separate BTC-R/BTC-A pair may only direct configuration of a target PGW. That is, PCRF 145 may provide only group policy configuration 360 without group policy configuration 350. In another implementation, a separate BTC-R/BTC-A pair may be used for the target MME and the target PGW, respectively, in place of the single BTC-R 340/BTC-A 345 pair shown in FIG. 3B. Thus, one BTC-R from SCEF 140 could include a target MME identifier, and another BTC-R command from SCEF 140 could include only a target PGW identifier. Additionally, the communications and signals explained and illustrated in FIGS. 3A and 3B are exemplary and may not represent each and every signal that may be exchanged.

Figure 6:
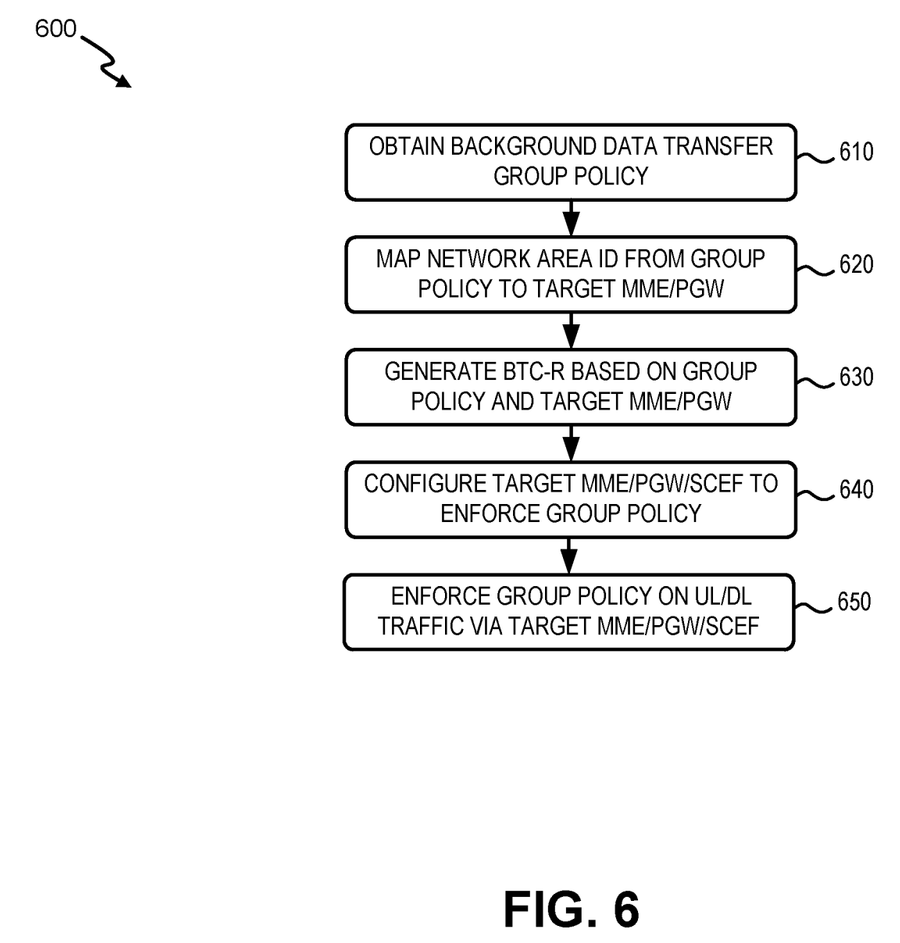
FIG. 6 is a flow diagram that illustrates an exemplary process for enforcing group policies for background data transfers, according to an implementation described herein.

FIG. 6 is a flow diagram illustrating an exemplary process 600 for enforcing group policies for background data transfers with MTC UEs. In one implementation, process 600 may be implemented by SCEF 140. In another implementation, process 600 may be implemented by SCEF 140, PCRF 145 and one or more other devices in network environment 100, such as MME 125, PGW 135 or another device in EPC 120.

Referring to FIG. 6, process 600 may include obtaining a background data transfer group policy (block 610). For example, SCEF 140 may generate BTR 310 and receive BTA 320 from PCRF 145. Among other information, BTR 310 and BTA 320 may include network-area-info list AVP 411 and transfer policy AVP 417. Transfer policy AVP 417 may provide a transfer window and/or an aggregate bandwidth limit for the group of MTC UEs corresponding to the group policy (e.g., MTC UEs 105-1 or 105-2).

Process 600 may also include mapping a network area identifier from the group policy to a target MME and/or a target PGW (block 620). For example, to identify the target MME 125 and target PGW 135, SCEF 140 may obtain mapping information 330 from HSS 150 using, for example, S6t interface 156. The mapping information may identify the serving MME 125 and/or PGW 135 for the group of MTC UEs 105 corresponding to the group policy.

Process 600 may further include generating a BTC-R based on the group policy and the target MME and/or the target PGW (block 630). For example, SCEF 140 may generate a BTC-R 340. BTC-R 340 may include fields and/or AVPs to allow PCRF 145 to configure MME 125 and PGW 135 for enforcement of the background data transfer policy in BTA 320. BTC-R 340 may be provided from SCEF 140 to PCRF 145 via Nt interface 142 or Rx interface 144

Process 600 may additionally include configuring the MME, the PGW, and/or the SCEF to enforce the group policy (block 640). For example, PCRF 145 may receive BTC-R 340 from SCEF 140. PCRF 145 may provide configuration instructions to MME 125 if the group policy includes transfer window restrictions. PCRF 145 may provide configuration instructions to PGW 135 if the group policy includes aggregate UL or DL bandwidth limits for user plane communications. If the group policy includes aggregate UL or DL bandwidth limits for background data transfers over the control plane, SCEF 145 may configure itself to monitor and enforce UL or DL bandwidth limits for the group policy (or, alternatively, PCRF 140 may provide configuration instructions).

Process 600 may also include enforcing the group policy on uplink and/or downlink traffic via the target MME, PGW, or SCEF (block 650). For example, MME 125 may monitor and enforce transfer windows for the group of MTC UEs 105 corresponding to the group policy. PGW 135 may monitor and enforce aggregated bandwidth limits in the user plane for the group of MTC UEs 105 corresponding to the group policy. In one implementation, PGW 135 may also enforce transfer windows, based on the time packets are sent through PGW 135. Additionally, or alternatively, SCEF 140 may monitor and enforce aggregated bandwidth limits in the control plane for the group of MTC UEs 105 corresponding to the group policy.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to Figs. FIGS. 3A-3C, 5A and 5B, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining, by one or more network devices in a core network, a group policy to support background data transfer for a group of user equipment (UEs) associated with a same network area identifier, wherein the group policy includes a transfer window for the background data transfer;
    mapping, by the one or more network devices, the network area identifier to a mobility management entity (MME) device;
    generating, by the one or more network devices, a configuration command to enforce the group policy by the MME device, wherein the configuration command includes the transfer window to be enforced by the MME; and
    configuring, by the one or more network devices and based on the configuration command, the MME device to enforce the transfer window for the group policy.

2. The method of claim 1, wherein the configuring comprises:
    sending configuration instructions, based on the configuration command, from a policy charging rules function (PCRF) device to the MME device.

3. The method of claim 1, wherein the configuration command further includes an aggregate downlink bandwidth limit for the background data transfer, and wherein the configuring comprises:
    sending configuration instructions for the aggregate downlink bandwidth limit, based on the configuration command, from a policy charging rules function (PCRF) device to a packet data network gateway (PGW) device.

4. The method of claim 3, wherein sending the configuration instructions from the PCRF device to the PGW device comprises:
    sending the configuration instructions using a structured interface for an evolved packet core network.

5. The method of claim 1, wherein the group policy further includes an aggregate bandwidth limit for the group of UEs for the background data transfer.

6. The method of claim 5, further comprising:
    enforcing, by the PGW a packet data network gateway (PGW) device, the aggregate bandwidth limit for the group of UEs.

7. The method of claim 1, further comprising:
    enforcing, by the MME device, the transfer window for the group of UEs.

8. The method of claim 5, wherein the one or more network devices includes a Service Capability Exposure Function (SCEF) device, and wherein the method further comprises:
    enforcing, by the SCEF device, the aggregate bandwidth limit for the group of UEs.

9. The method of claim 1, wherein obtaining the group policy includes:
    generating a background data transfer request (BTR) or receiving a background data transfer answer (BTA).

10. The method of claim 1, further comprising:
    sending, by the one or more network devices, the configuration command via one of an Nt interface or an Rx interface for an evolved packet core network.

11. A system comprising one or more network devices, the one or more network devices including:
    one or more memories to store instructions;
    a communication interface configured to connect to one or more devices in an evolved packet core network; and
    one or more processors to execute the instructions to:
        obtain a group policy to support background data transfer for a group of user equipment (UEs) associated with a common network area identifier, wherein the group policy includes a transfer window for the background data transfer;
        map the network area identifier to a mobility management entity (MME) device;
        generate a configuration command to enforce the group policy by the MME device, wherein the configuration command includes the transfer window to be enforced by the MME; and
        configure, based on the configuration command, the MME device to enforce the transfer window for the group policy.

12. The system of claim 11, wherein the group of UEs include machine-type communications (MTC) UEs.

13. The system of claim 11, wherein one or more network devices include a policy charging rules function (PCRF) device, wherein the configuration command further includes an aggregate downlink bandwidth limit for the background data transfer, and wherein the one or more processors are further to execute the instructions to:
    send configuration instructions for the aggregate downlink bandwidth limit, based on the configuration command, from the PCRF device to the MME device.

14. The system of claim 13, wherein, when sending the configuration instructions from the PCRF device to the MME device, the one or more processors are further to execute the instructions to:
    send the configuration instructions using a structured interface for an evolved packet core network.

15. The system of claim 13, wherein the system further comprises the MME device, the MME device being configured to:
    enforce the transfer window for the group of UEs by preventing user plane connectivity by the group of UEs outside of a start time and a stop time indicated in the configuration instructions.

16. The system of claim 11, wherein one or more network devices include a policy charging rules function (PCRF) device, and wherein the one or more processors are further to execute the instructions to:
    send configuration instructions, based on the configuration command, from the PCRF device to a packet data network gateway (PGW) device.

17. The system of claim 16, wherein the group policy includes an aggregate bandwidth limit for the group of UEs, and wherein the system further comprises the PGW device, the PGW device being configured to:

enforce the aggregate bandwidth limit for the group of UEs by dropping packets when the aggregate bandwidth exceeds the aggregate bandwidth limit.

18. The system of claim 17, wherein the aggregate bandwidth limit includes an uplink (UL) limit and a downlink (DL) limit.

19. A non-transitory computer-readable medium containing instructions executable by at least one processor, the computer-readable medium comprising one or more instructions to:

obtain a group policy to support background data transfer for a group of user equipment (UEs) associated with a common network area identifier, wherein the group policy includes a transfer window for the background data transfer;

map the network area identifier to a mobility management entity (MME) device;

generate a configuration command to enforce the group policy by the MME device, wherein the configuration command includes the transfer window to be enforced by the MME; and configure, based on the configuration command, the MME device to enforce the transfer window for the group policy.

20. The non-transitory computer-readable medium claim 19, further comprising one or more instructions to:

send first configuration instructions, based on the configuration command, from a policy charging rules function (PCRF) device to a packet data network gateway (PGW) device using a Gx interface for an evolved packet core network; and send second configuration instructions, based on the configuration command, from the PCRF device to the MME device, using another structured interface for the evolved packet core network.

* * * * *